Dec. 17, 1957 M. J. WEST 2,816,710
REGISTERING AND CONTROL OF INTERMITTENT
WEB TRAVEL IN MEASURED LENGTHS
Filed April 30, 1954 4 Sheets-Sheet 1

INVENTOR
Michael J. West,
BY
ATTORNEY

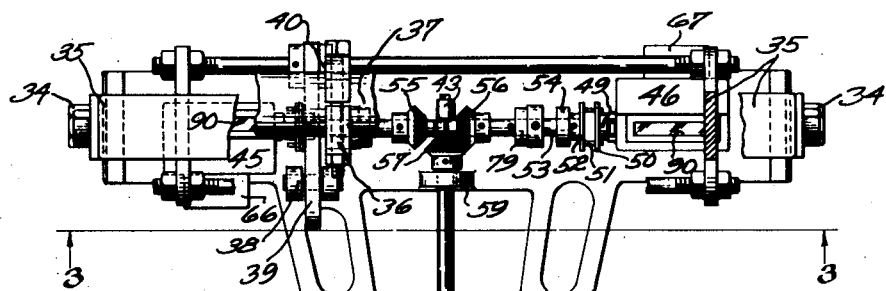
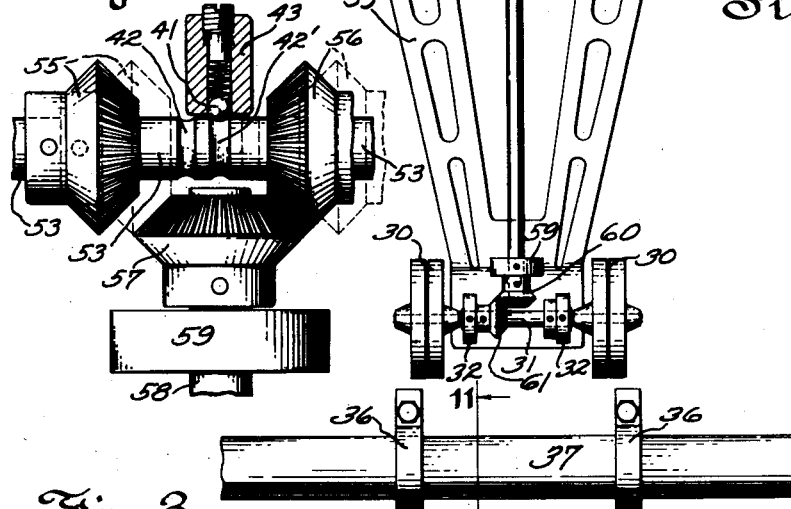
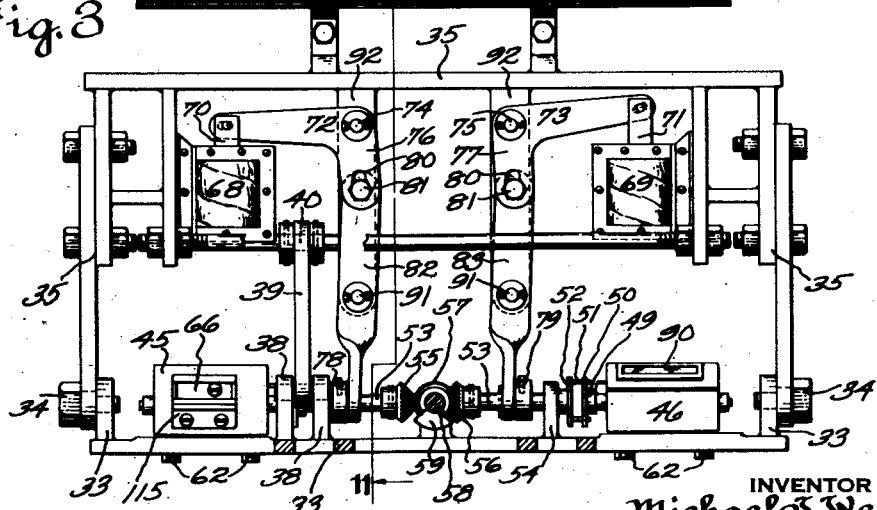

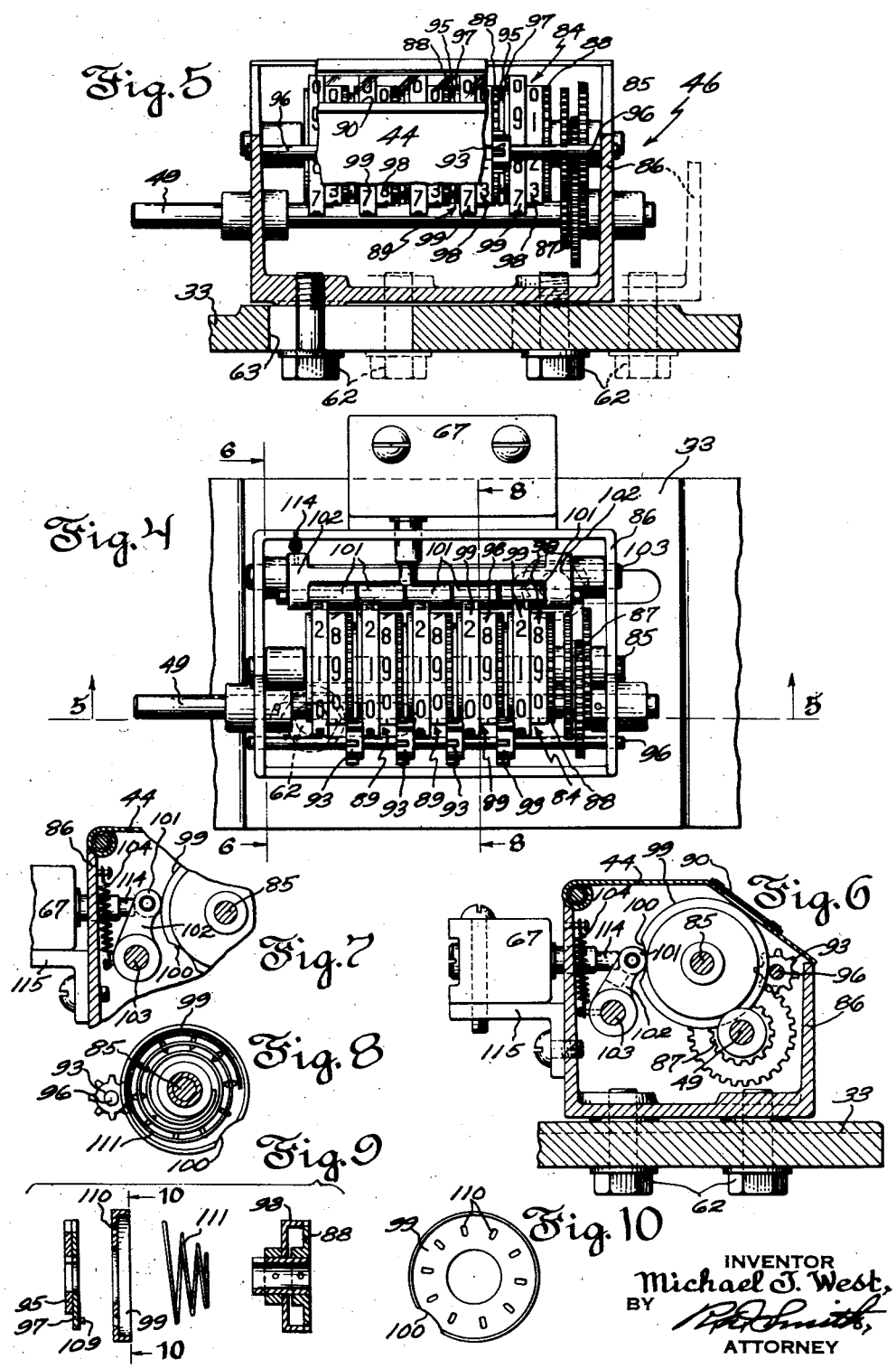

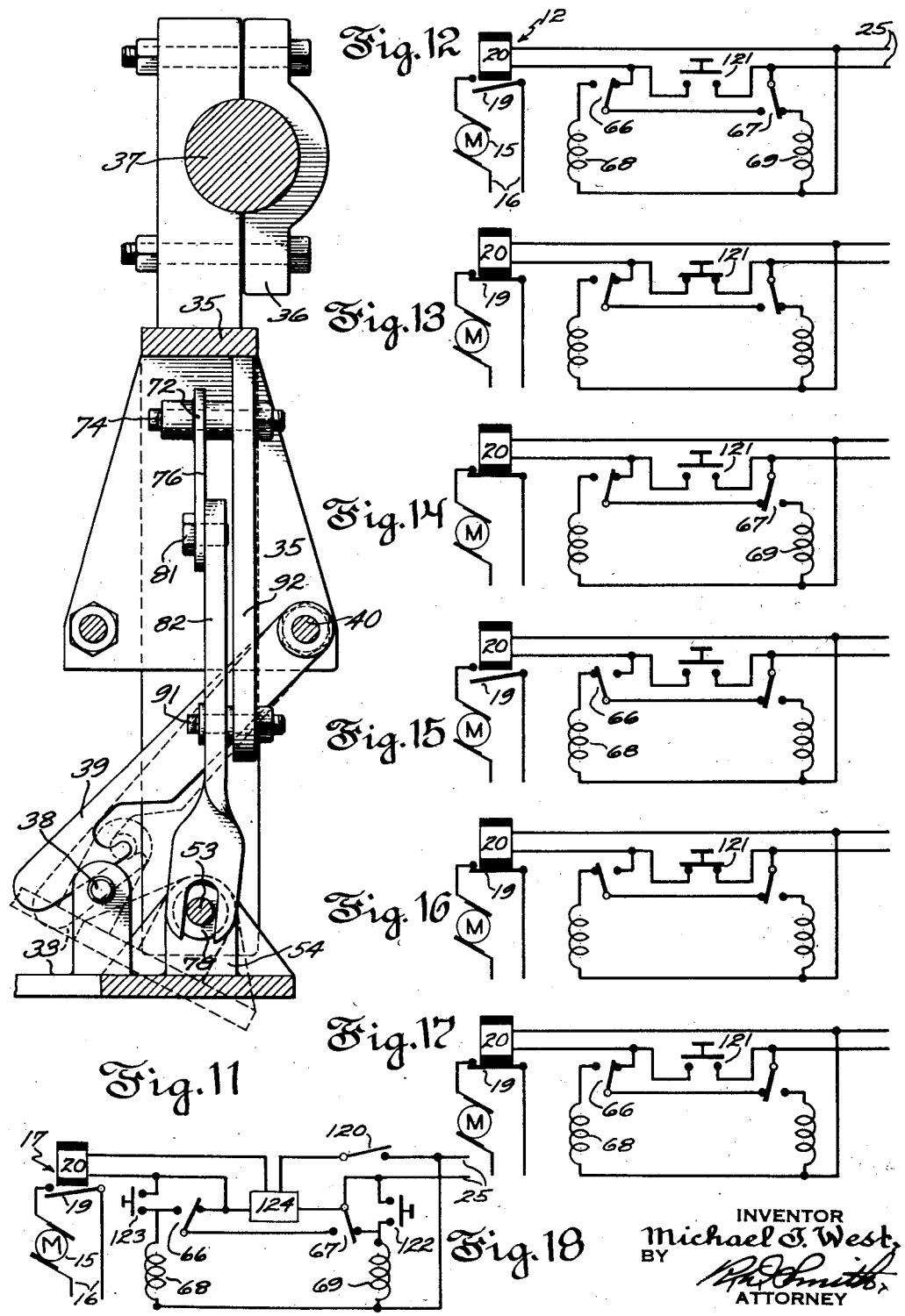

United States Patent Office 2,816,710
Patented Dec. 17, 1957

2,816,710

REGISTERING AND CONTROL OF INTERMITTENT WEB TRAVEL IN MEASURED LENGTHS

Michael J. West, Shelton, Conn., assignor, by mesne assignments, to The B. F. Goodrich Company, Akron, Ohio, a corporation of New York Application April 30, 1954, Serial No. 426,887

12 Claims. (Cl. 235—132)

This invention relates to apparatus in which the advancing travel of a continuous web is automatically stopped after a predetermined, automatically measured length of the web has passed a predetermined point in the control apparatus whereafter the web remains stopped long enough to permit the performing of some operation upon it requiring that the web be stationary, such as a severing operation. After this the advancing travel of the web may be manually or automatically restarted and continued until a further and like predetermined length of web has passed the controlling point in the apparatus thus completing a cycle of web stopping and restarting action.

One object of the invention is to make the cyclic action of such an apparatus automatic throughout requiring no manual attention thereto, or optionally when desired to be able to interrupt the automatic cycle manually without affecting the predetermined length of passing web that will occasion the automatic stopping action.

Another object is to cause the stopping of the web travel to be governed by the passing of a predetermined length of the traveling web, and to cause the restarting of web travel to be determined by the length of time required to perform the aforesaid operation upon the web while it remains stopped.

A related object is to register and exhibit at all times during each cycle of web stopping and restarting control action a dimensional indication of what length of web has passed a predetermined point in the apparatus since its travel was last restarted at the beginning of the cycle, as well as what length of web remains to travel past said point in the apparatus before such travel will next be stopped automatically.

A further object is to combine with two registers, one for counting increments of length additively and the other for simultaneously uncounting increments of length subtractively, a means for setting said registers so that their counting and uncounting functions are restricted to a preselected extent of travel of the work sheet together with limit switches operative automatically to stop the advance of the work sheet at the end of each such extent of travel.

A further object of the invention is to measure off increments of the continuous length of a web or work sheet that passes through the apparatus by means of a web contacting, travel sensing instrumentality capable of responding successfully to the moving surface of webs or continuous work sheets that are composed of some easily distortable material, such as soft, spongy or elastic rubber or sponge rubber or foam rubber, and without inaccuracy being occasioned in the measurement of the increments of length by the yielding nature of the material.

A further object is to provide apparatus capable of operating equally well on webs composed of work sheet material that varies considerably in thickness, hardness, surface friction and other physical properties.

These and related objects of the invention will become evident from the following description of a successful embodiment of the invention having reference to the accompanying drawings, wherein:

In the drawings the numbered arrows applied to section planes indicate the direction in which the structure is viewed in drawing figures that are correspondingly numbered.

Fig. 2 is a plan view of the lower part of the apparatus with parts of its supporting superstructure broken away.

Fig. 2a is an enlarged fragmentary plan view of the direction shifting clutch of Fig. 2.

Fig. 3 is a view of the apparatus in front elevation taken in section on the plane 3—3 in Fig. 2.

Fig. 4 is a plan view drawn on an enlarged scale showing one of the circuit controlling, length indicating, number registers with its cover plate removed.

Fig. 5 is a view of the register in front elevation taken partially in section on the plane 5—5 in Fig. 4.

Fig. 6 is a view taken partially in section on the plane 6—6 in Fig. 4 showing the electric switch operating number wheels set in zero position.

Fig. 7 is a fragmentary view of parts in Fig. 6 showing a numbered wheel displaced from zero position to actuate the switch.

Fig. 8 is a view taken in section on the plane 8—8 in Fig. 4.

Fig. 9 is an exploded view of interior parts associated with each number wheel unit in the register of Fig. 4.

Fig. 10 is a view looking at one of the parts in Fig. 9 from the plane 10—10.

Fig. 11 is an enlarged view taken in section on the plane 11—11 in Fig. 1 showing a latch for holding the measuring wheels elevated and out of rolling contact with the work.

Figs. 12 to 17, inclusive, show various conditioning of circuits in an explanative electrical system in which system elements of the apparatus in Fig. 1 appear cooperatively associated and designated by corresponding reference numerals.

Fig. 18 shows several modifications of or control additions to the electric system of Figs. 12 to 17.

Figure 1:
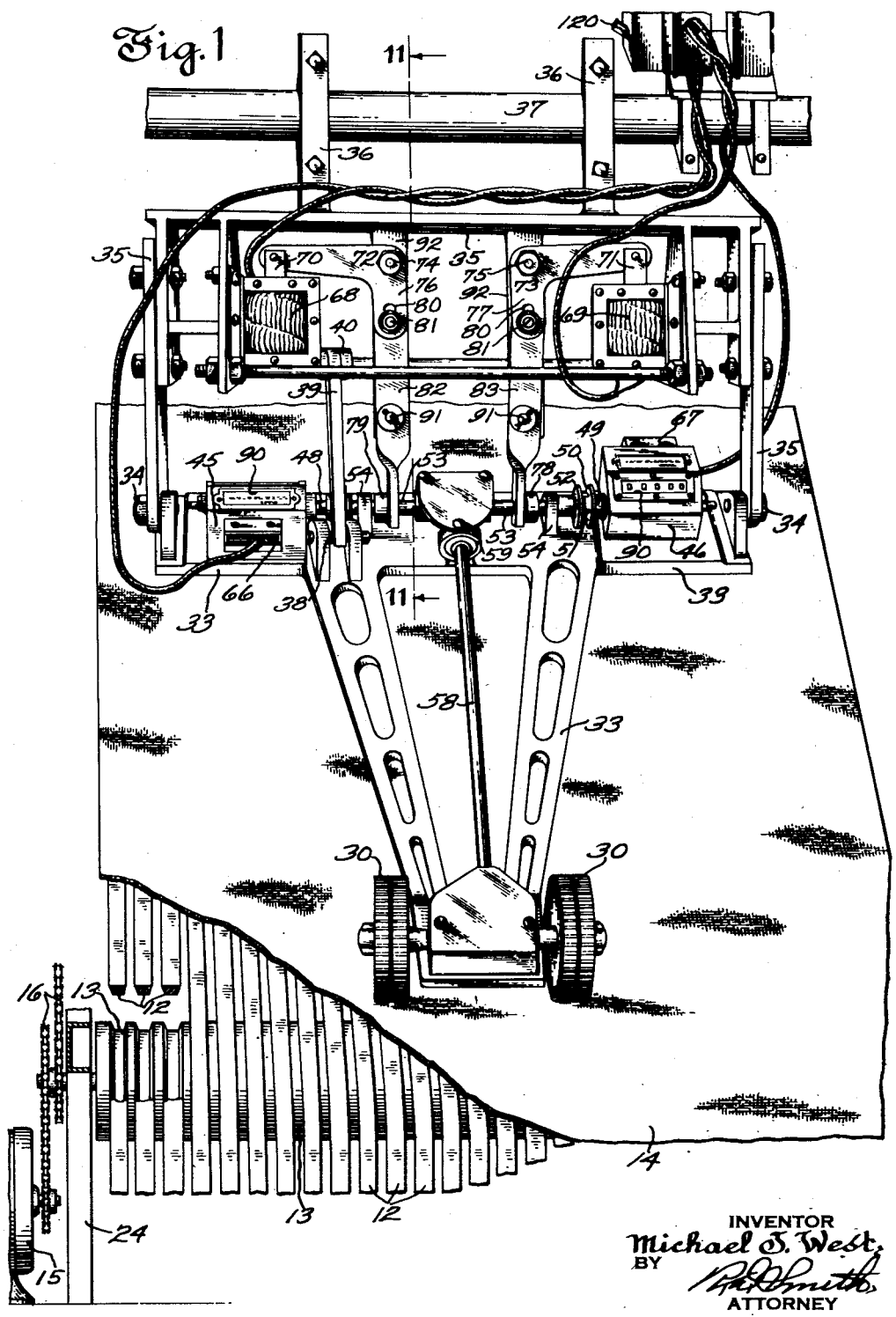
Fig. 1 is a perspective view of a continuous sheet or web of work material being conveyed toward and past a measured length travel stopping and restarting apparatus embodying the present invention.

The web travel measuring and controlling apparatus embodying the present improvements is susceptible of use in most any kind of web processing machine that involves a traveling conveyor such as belts 12 impelled by suitably powered pulleys 13 and carrying in unison with it on the top surface thereof a web 14 of sheet-like work material which for purposes of the present illustration may be a sheet of sponge rubber of unlimited length.

Belt pulleys 13 are rotated unidirectionally and continually by motor 15 through transmission 16 so that stopping and starting of motor 15 will stop and start the travel of conveyor belts 12 and of the web of work material 14 riding thereupon as they travel in unison in Fig. 1 under and in contact with traction wheels 30 of the length measuring and control apparatus.

An operation that it may be desired to perform upon the web at predetermined spacings along its length and that requires the travel of the web to be temporarily stopped is to sever the web in a lateral direction prior to carrying the severed web lengths to some destination such as to a shipping container or storage reel (not shown).

In the herein illustrated control apparatus incorporating the present improvements a pair of length measuring traction wheels 30 assume the form of sensing rollers fixed on the opposite ends of a short axle shaft 31 that is journaled in bearings 32 carried at the end of a swingable overarm 33 that operates above the traveling web 14.

This arm can be of skeletonized structure and triangular shape pivotally supported at 34 on a stationary sub-frame 35 that is adjustably mounted by clamps 36 in a stationary position on a rigid cross rod 37 fixed on the framework 24 of the main machine. Thus traction wheels or sensing rollers 30 constantly rest by gravity on the surface of web 14 as the latter progressively advances under and in driving contact with the wheels. However, upon occasion the overarm 33 may be swung upward to its broken-line position shown in Fig. 11 in which position an upstanding detent bail 38 carried on the arm can be engaged by a retaining hook 39 which swings from a pivot 40 on the frame 35 to hold the arm in upwardly inclined position with the sensing rollers 30 elevated well above and out of contact with traveling web 14. The periphery of rollers 30 are roughened for tractional grab so that they will be caused to rotate dependably in true accordance with the linear speed of the web with absence of slippage therebetween.

Mounted on the cantilever arm 33 there are two laterally spaced apart electric circuit controlling number registers 45 and 46 whose interior mechanism is shown in detail in Figs. 4 to 10 and whose number wheels 99 are rotated in counter-like fashion by the turning of coaxial stub shafts 48 and 49. The registers face in opposite directions so that the unidirectional rotary travel of a single actuating shaft 53 when rotated in bearings 54 fixed on the mounted cross portion of arm 33 can turn shafts 48 and 49 simultaneously in opposite rotary directions with respect to the body of the register 45 or 46 but in the same rotary direction in relation to each other and with respect to all other parts of the apparatus.

To enable actuating shaft 53 to be shifted axially and yet to remain coupled to both register shafts 48 and 49, shaft 53 carries fixedly at each of its ends a dog plate whose driving pins 51 slidably engage holes of uniform angular spacing in the driven flange 50 on each of register shafts 48 and 49. Shaft 53 is journaled in bearings 54 and axially slidable therein so that either one or another of two driven bevel pinions 55 and 56 fixed on shaft 53 can mesh with a driving bevel pinion 57 fixed on the end of a propeller shaft 58 perpendicular to shaft 53 and that is journaled in bearings 59 fixed on the arm 33. At its opposite end, propeller shaft 58 carries fixed thereon a driven bevel pinion 60 that is constantly in mesh with a driving bevel pinion 61 on the aforesaid axle shaft 31 that carries the traction wheels 30.

Shaft 53 is shifted by electromagnetically operated apparatus to move pinions 55 and 56 in unison toward the right or toward the left in Fig. 3 when electrically energized by either a switch 66 that is incorporated in the register 45, or by a switch 67 that is incorporated in the register 46. Thus the movable pinions 55, 56 serve as a direction reversing clutch, they being yieldably retained in either their full line positions or broken line positions in Fig. 2a by the spring backed detent ball 41 engaging one or the other of shaft grooves 42, 42′ when shaft 53 is shifted from one position to the other by one or the other of solenoids 68 or 69. Detent ball 41 is constrained and stationed by the arm mounted support bracket 43. Both switches 66 and 67 are mechanically actuated to make or break circuit by mechanism contained within the registers 45, 46 later to be described.

The electromagnetic shifting apparatus includes solenoid 68 and a reciprocally acting solenoid 69 fixedly carried on the subframe 35 in such position that their respective electromagnetically operated plungers 70 and 71 reciprocate in a vertical direction thereby to swing bell cranks 72 and 73 about their respective pivots 74 and 75 stationed on subframe 35. Downwardly extended arms 76 and 77 of bell cranks 72 and 73 have an elongated slot 80 that is in pivotal sliding engagement with a stud 81 in the top end of shifter levers 82 and 83 that are pivotally supported at 91 on frame brackets 92. At their bifurcate bottom ends shifter levers 82, 83 straddle the actuating shaft 53 in flanking relation to collars 78 and 79 fixed on the shaft to receive the thrust of the shifter arms in an axial direction of movement of shaft 53.

There remains to be described enough of the construction and functioning of the counter mechanism inside of registers 45 and 46 to explain the ability of each of these registers to perform the combined function of indicating what length of traveling web has already passed under traction wheels 30 and what length remains to pass under said wheels between the times of register-caused actuations of a switch 66 or 67 which result from a predetermined extent of turning of the number wheels 99. Since the construction and operation of the two registers are alike it will suffice to describe the contained mechanism of either of the registers as illustrated in Figs. 4 to 10.

The stub shafts 48 or 49 of both registers are in coaxial alignment with their common actuating shaft 53. Each register is releasably fixed on the swingable arm structure 33 by means of bolts 62 that may be loosened to be slidable in elongated slots 63 in arm 33. Thus bodily displacement of each register can be made in line with the axis of shaft 53 from a full line position to a broken line position in Fig. 7 for the purpose of separating the dog pins 51 from driving engagement with the flange 50 of the stub shaft of the register. Actuating shaft 53 is in coaxial relation to the pivots 34 on which arm 33 is swingable. When dog pins 51 are thus disengaged from flange 50, number wheel units 84, 89 in the register can be turned to various initial settings wherefore to vary the predetermined length of traveling web that will cause completion of the automatic cycle of register action. After the number wheel adjustment is changed the register will be bodily restored into constantly coupled driven relation to the actuating shaft 53.

The interconnected number wheel units 84, 89, 89 etc. are of a construction that is usual in so-called "counters" and may be similar in details to those shown in U. S. Patent No. 2,040,026. Certain modifications of their construction differing from the conventional will be described.

The wheel unit 84 of the first or lowest denomination is freely rotatable about a wheel shaft 85 that is stationed in housing 86 of the register. This and each of the other wheel units 89 is driven from the stub shaft 48 or 49 of the register through a set of reduction gears 87. Gear 88 of each wheel unit is fixed to turn in unison with number wheel 98 and with a two-tooth gear 95 of the same unit. Each two-tooth gear 95 is accompanied by a notched locking disc 97 in fixed relation thereto to constitute a Geneva stop type of intermittent drive for the four tooth side of a transfer pinion 93 whose adjacent side has eight teeth constantly in mesh with the twenty-tooth gear 88 of the wheel unit 89 of next higher denomination. This results in each number wheel unit of the next higher unit remaining stationary until it is picked up intermittently and advanced one number at a time in either rotary direction by the rotary driving action of one of the several transfer pinions 93 that are rotatable about a supporting shaft 96 mounted in the end walls of register casing 86. This contrasts with the conventional construction of registers incorporating counter mechanism in that by conventional practice each number wheel is ratchet driven only in a single rotary direction because required to be free slipping in the opposite direction to enable it to be returned very quickly by hand to zero position without being impelled through many turns of the transfer mechanism. In the present improvement number wheels 98 can be returned to an initial zero setting only by running them back through as many turns of the transfer mechanism as occurred to advance them away from zero to the point where they are ready for reversal. But each of the notched number wheels 99 in all wheel units 84, 89 is independently adjustable to any desired rotary setting at will as will now be made clear.

In each wheel unit the number wheel 99 is of larger diameter and is provided with a preipheral notch 100. The notches 100 in all number wheels 99 will be in alignment in an axial direction when all of wheels 99 register zero in the window 90 in the hinged cover 44 of the register housing 86. Notches 100 are adapted to be engaged respectively by separate rollers 101 carried side by side on a swingable rocker frame 102 that is pivotally supported at 103 by the walls of the register housing.

Referring particularly to Figs. 8, 9 and 10, the selected setting of the larger number wheel 99 in any wheel unit 84 or 89 in variable rotary relation to the two-tooth gear 95, and to the smaller number wheel 98 that is fixed thereto in the same wheel unit, is permitted and releasably maintained by the usual engagement of a driving stud 109 projecting laterally from locking disc 95 with some one of ten driven holes 110 in the web wall of number wheel 99 which pin and holes are kept releasably in engagement by an axially expansive spring coil 111 imprisoned between the hollow number wheels 98 and 99 and within the latter. When its periphery is grasped by the operator's fingers and displaced toward the right so that hollow number wheel 99 telescopically overlaps number wheel 98, any one of the holes 110 can selectively be placed in register with driving stud 109 and its engagement therewith restored by spring 111. The parts just referred to are shown in exploded relation in Fig. 9. Fig. 10 shows the holes 110 in the web wall of the notched number wheel 99. For further particulars of the wheel unit construction the aforementioned U. S. Patent No. 2,040,026 and also U. S. Patent No. 2,581,859 may be referred to. No use need be made herein of the driving pawls shown in Figs. 7 and 9 of the former patent.

It will be observed that the window registering numerals on the periphery of the larger number wheel 99 are marked to progress in the opposite rotary direction from the registering numerals on the smaller number wheel 98 so that whenever the wheel units are progressively turned in either rotary direction one number wheel of each wheel unit will count additively while the other number wheel of the same unit will count subtractively or retrogress in the magnitude of numerical value registered thereby in the window 90. Also the series of increment counting numerals on the number wheel 99 in one register denote increasing values in, say, a clockwise order about said wheel while the series of counting numerals on the number wheel 99 in the other register denote decreasing values in a clockwise order about the latter wheel.

The swinging movement of the roller carrying rocker 102 about its pivot 103 alternately at the beginning and end respectively of a counting cycle pushes against the plunger 114 of the switch 66 or 67 and releases the same for self return to its position shown in Fig. 6 occasioned by a spring (not shown) within the switch housing. The switch is mounted on the rear wall of register housing 86 by means of an angle bracket 115. Switch operating plunger 114 projects through an aperture in the rear wall of the register housing. The position of the parts shown in Fig. 6 is as they stand when rocker 102 is admitted to all the wheel notches 100 of a single register for conditioning the contacts in the double-throw switch 67, while Fig. 7 shows the parts as positioned when the switch plunger 114 has been forced inward toward the switch to differently condition the contacts therewithin. I may make make use of a so-called micro switch of any well known variety wherein slight movement of the plunger 114 occasions snap action of the contacts of the double-throw switch to shift current from one circuit path to another. Rocker frame 102 is normally urged toward the number wheels by a spring 104.

The principle of operation of the apparatus that has now been described can be illustrated by assuming that it is desired to make a setting that will result in the travel of web 14 being automatically stopped each time fifteen feet of its length has passed under the travel sensing wheels 30 subsequent to the last time the travel of the web was resumed following its previous resting period.

By loosening holding bolts 62, register 46 can be displaced bodily toward the right from its drive-coupled, full line position in Figs. 2, 3 and 5 to its broken line position in Fig. 5 wherein it is uncoupled from actuating shaft 53. Register 45 can likewise be uncoupled from actuating shaft 53 by shifting it bodily toward the left. Now all number wheel units in each register are free for independent setting.

In register 46 for instance, the number wheel 98 of wheel units 84 and 89 may be set to register numerals "5" and "1" respectively, while all of the notched number wheels 99 in all number wheel units of register 46 will be given such rotary adjustment that they register "0" in the casing window 90. This causes all rollers 101 of rocker 102 to seat simultaneously in the notches 100 of all number wheels 99 in register 46 so that the rocker tilts toward the right into its position shown in Fig. 6 wherein the electric contacts in switch 67 on register 46 condition the circuits as shown in the diagram of Fig. 12.

In register 45 all of the number wheels 98 will be set at zero while the notched number wheels 99 of unit 84, and of adjoining wheel unit 89 will be set respectively so that their numerals "5" and "1" register in the casing window. In this setting of the wheels 99, the rocker 102 will be displaced from the notches 100 in said two wheels and the plunger 114 of the switch of register 45 will be cammed into the position shown in Fig. 7 wherein the electric contacts in switch 66 on register 45 condition the circuits also as shown in Fig. 12.

After the above settings have been effected both registers will be restored into coupled relation to their common actuating shaft 53.

When current is furnished to the electrical system to run the conveyor driving motor 15 the travel of the web is such that one of the driven pinions 55, 56 on shaft 53 will be in mesh with driving pinion 57 on propeller shaft 58 which will cause travel of the web to turn one or more of the notched wheels 99 in register 45 in one rotary direction while the corresponding notched wheel 99 in register 46 will simultaneously be turned in the opposite rotary direction. The same is true of the number wheels 98 in the two registers. This results during a single cycle of operation of the apparatus in the notched wheels 99 of register 46, which were set to start at "zero," being automatically advanced to a point where they register "15," while simultaneously the notched wheels 99 of register 45, which were set to start at "15" will automatically retrogress until they all register "0" in register 45 at the time "15" is registered by the notched wheels 99 in register 46.

Thus at the end of each cycle of operation one or the other of the register actuated switches 66 or 67 will have its plunger 114 released for outward movement to shift the circuit connections to produce an electrical effect in the apparatus that will be reversed at the beginning of the next occurring cycle when the notched wheel 99 of lowest denomination starts away from its zero registering position.

It will be clear from the foregoing that the numerals on the notched wheels 99 in the register that is counting subtractively will always register the length of web that remains to pass the travel sensing roller 30 before automatic switching of the circuits takes place whereas the numerals on the number wheels 98 in the same register at all times register the length of web that already has passed the traction wheels 30 since the beginning of the occurring cycle of web travel.

A more concise explanation of the repetitive cycling action will now be given by reference to an elementary hook-up of the electrical circuit governing and governed parts of the system wherein parts of the apparatus appearing in Figs. 1 to 11 are designated by corresponding numerals.

In Fig. 12, the unidirectional web impelling motor 15 will be understood to be started and stopped by means of a conventional relay 17. The independent power circuit 16 for motor 15 is made and broken by an electromagnetically actuated switch 19 in the relay. The solenoid 20 of the relay is energized and deenergized by the joint current switching action of the register switches 67 and 66.

In Fig. 12 current to relay solenoid 20 from the control circuit supply 25 is cut off by switch 67. Hence motor 15 is idle and the web 14 is at rest. Simultaneously switch 67 energizes solenoid 69 to determine the direction in which the register driving shaft 53 will be caused to rotate when the web resumes its unidirectional intermittent travel. Such travel is resumed when the normally open restart switch 121 is momentarily closed as shown in Fig. 13. This short circuits the still open, relay energizing contacts in switch 67 causing motor 15 to start. Consequent travel of the web rotates the number wheels in register 46 so that revolving of the notch 100 in number wheel 99 cams switch plunger 114 inward of the switch 67 so that its contacts operate to maintain the flow of current through the relay solenoid 20 after the momentary restart switch 121 has reopened. This condition is shown in Fig. 14 where the web has resumed its travel, the extent of which in units of length will be counted and exhibited by the accompanying advance of number wheels 99 from indication zero (numeral "0") to a length of fifteen feet (numeral "15"). Also in Fig. 14 the direction shifting solenoid 69 is seen to have become denergized by cutting off of current thereto at the switch 67.

When travel of the web has proceeded until numerals "1—5" on wheels 99 and 99, respectively, appear in window 90 of register 46, the numerals "0—0" of the corresponding wheels will appear in the window of register 45, which means that all notches 100 in the wheels 99 of the latter register will have become aligned, enabling switch 66 to shift the circuits into the condition shown in Fig. 15 where relay solenoid 20 is deenergized by cutting off of current at switch 66 causing the relay switch 19 to open and stop the running of motor 15. Simultaneously the direction reversing solenoid 68 becomes and remains energized so that it acts to reverse the direction in which register driving shaft 53 will rotate consequent upon the unidirectional travel of web 14 when such travel is resumed.

Such travel of the web will be resumed when the restart switch 121 is again momentarily closed as shown in Fig. 16. This short circuits the still open, relay energizing contact in switch 66 causing motor 15 to restart. Consequent travel of the web rotates the number wheels in register 45 so that revolving of the notch 100 in number wheel 99 cams switch plunger 114 inward of switch 66 so that its contacts operate to maintain the flow of current through relay solenoid 20 after momentary restart switch 121 has reopened. This condition is shown in Fig. 12 which was the beginning point of the cycle comprising two start and stop operations during one of which the registers were driven in unison in one rotary direction and during the other of which the registers were driven in unison in a reverse rotary direction.

A manual switch 120 is provided for cutting off current to solenoid 20 for stopping motor 15 and the travel of the web at any desired time independently of the automatic control action of register switches 66, 67. Separate normally open momentary contact switches 122 or 123 similar to 121 can be electrically connected to short circuit each of register switches 66 and 67 independently for manual operation to energize the direction shifting solenoids 68, 69 respectively at will. Where circuiting is such that the solenoids 68 or 69 remains electrically energized throughout the cycle of travel of the web the detent 41 will not be necessary for holding pinion 55 or 56 in mesh. If switches 66 and 67 have too low an electrical rating to handle the current demanded by solenoids 68 and 69 directly, the usual relays may be introduced to handle such current. See Fig. 18.

In place of the manually operated restart switch 121 there may be inserted in the circuits an automatically operating electronic timer.

With an automatic timer, whether or not of the electronic type, properly connected in the system as is within the skill of the calling of a competent electrical engineer or electrician aided by circuiting instructions from the maker of the timer, at each automatic cut off of current to relay solenoid 20 by either of switches 66 or 67 there will be started a cycle of automatic action within the timer which after a pre-set period of time will automatically cause the solenoid 20 to be reenergized as is done in Fig. 12 by the manual closing of momentary contact switch 121.

The foregoing modifications of and additions to the system of Fig. 19 are represented diagrammatically in Fig. 18. These and many other modifications of the electrical system and of the mechanical parts and their arrangements may be made within the framework and scope of the invention to which the appended claims are directed and which the claims are intended to cover.

I claim:

1. Apparatus for constantly exhibiting at each lateral margin of a wide traveling work sheet the number of increments of length advanced and to be advanced by said sheet within a preselected extent of travel thereof, including in combination, means to cause unidirectional travel of the work sheet, a travel sensing roller adapted to make traction contact with the surface of the work sheet, two sets of increment counting wheels housed in separate spaced apart windowed casings and interconnected to cause each of said sets of wheels to turn simultaneously in the same rotary direction, each of said sets including wheels bearing a separate and similar series of increment counting numerals, the numerals in one of said series denoting increasing values of count in clockwise order about their carrying wheel and the numerals in the other of said series denoting decreasing values of count in clockwise order about their carrying wheel, driving connections outside of said casings imparting motion from said travel sensing roller to both of said sets of counting wheels simultaneously in a common rotary direction, and shiftable clutch means outside of said casings incorporated in said driving connections operative when shifted to reverse the common direction in which both of said sets of counting wheels are turned simultaneously by unidirectional advance of the work sheet, whereby wheels in each of said sets perform additive counting of said traveling increments of length and subtractive counting of said traveling increments of length.

2. Apparatus as defined in claim 1, together with an electromagnetic prime mover outside of said casings electrically energized through a control circuit and mechanically connected to shift the said clutch, and current switching means controlling said circuit operably related mechanically to at least one of the said sets of counting wheels.

3. Apparatus as defined in claim 1, in which the said work sheet impelling means is an electric motor, together with a power circuit containing said motor, a relay outside of said casings in said power circuit including an electromagnet, and current switching means controlling said electromagnet in part operably related mechanically to each of the said sets of increment counting wheels.

4. Apparatus as defined in claim 1, in which the said work sheet impelling means is an electric motor, together with a power circuit containing said motor, an electromagnetic prime mover outside of the said casings mechanically connected to shift the said clutch, a control circuit containing said prime mover, and current switching means controlling both of said circuits operably related mechanically to at least one of said sets of increment counting wheels.

5. Apparatus as defined in claim 1, in which the said work sheet impelling means is an electric motor, together with a power circuit containing said motor, an electromagnetic prime mover outside of the said casings mechanically connected to shift the clutch, a control circuit containing said prime mover, and separate current switching means respectively controlling both of said circuits and operably related mechanically to each of the said sets of increment counting wheels.

6. Apparatus as defined in claim 1, in which the said work sheet impelling means is an electric motor, together with a power circuit containing said motor, a relay outside of the said casings in said power circuit including an electromagnet, and current switching means structurally associated with each of said casings controlling said electromagnet and operably related mechanically to at least one of the said increment counting wheels of the set housed by the casing.

7. Apparatus for constantly exhibiting the number of increments of length advanced and to be advanced by a work sheet within a preselected extent of travel thereof, including in combination, a main machine frame, an electrically powered work sheet conveyer, pulleys journaled in said frame supporting and impelling said conveyer, a subframe stationed on said main frame above said conveyer, an overarm hinged on said subframe to swing upward and downward about an axis transverse the direction of travel of said conveyer, a travel sensing roller journaled at the free end of said overarm in position to rest and roll on a work sheet traveling on and with said conveyer under and past said sensing roller, current switching mechanism for electrically controlling said conveyer including a switch actuating wheel pivotally mounted on said overarm to rotate coaxially with said transverse hinge axis, and a propeller shaft extending longitudinally of said overarm having driven connection at one end to said sensing roller and driving connection at its other end to said current switching mechanism.

8. Apparatus as defined in claim 7, together with a catch movably mounted on the said subframe to and from a position to engage with the said overarm when the latter is swung to elevated position thereby to hold the said sensing wheel out of contact with a conveyer carried work sheet.

9. Apparatus as defined in claim 7, together with a clutch supported on the said overarm in operative relation to the said current switching mechanism, and an electromagnet clutch shifting device supported on said subframe electrically connected to said current switching mechanism.

10. Apparatus for constantly exhibiting the number of increments of length advanced and to be advanced by a work sheet within a preselected extent of travel thereof, including in combination, a main machine frame, a work sheet conveyer, pulleys journaled in said frame supporting and impelling said conveyer, a subframe stationed on said main frame above said conveyer, an overarm hinged on said subframe to swing upward and downward about an axis transverse said conveyer, a travel sensing roller journaled in the free end of said overarm in position to rest and roll on a work sheet traveling on and with said conveyer under and past said sensing roller, counting wheels journaled no said overarm, an actuating shaft coupled to said counting wheels journaled on said overarm to rotate coaxially with said transverse hinge axis, and a propeller shaft extending longitudinally of said overarm having driven connection at one end to said sensing roller and driving connection at its other end to said actuating shaft.

11. Apparatus as defined in claim 10, in which the said counting wheels are spaced apart at respectively opposite sides of the said driving end of the said propeller shaft.

12. Apparatus as defined in claim 11, together with separate bearing supports for the said counting wheels, each of said supports being shiftable in the line of the said transverse hinge axis in a direction to displace said counting wheels from coupled relation to the said actuating shaft.

References Cited in the file of this patent
UNITED STATES PATENTS

| Number | Name | Date |
|---|---|---|
| 1,391,431 | Turner | Sept. 20, 1921 |
| 2,122,710 | Bidwell et al. | July 5, 1938 |
| 2,269,043 | Spaunburg | Jan. 6, 1942 |
| 2,269,330 | Andren et al. | Jan. 6, 1942 |
| 2,468,334 | Kennedy | Apr. 26, 1949 |